United States Patent
Kandula et al.

(10) Patent No.: US 11,190,431 B2
(45) Date of Patent: Nov. 30, 2021

(54) PRIORITIZED CLIENT-SERVER COMMUNICATIONS BASED ON SERVER HEALTH

(71) Applicant: VMWARE, INC., Palo Alto, CA (US)

(72) Inventors: Srinivas Kandula, Bangalore (IN); Reghuram Vasanthakumari, Bangalore (IN); Scott Feldstein, Palo Alto, CA (US); Padmini Sampige Thirumalachar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 481 days.

(21) Appl. No.: 15/803,877

(22) Filed: Nov. 6, 2017

(65) Prior Publication Data
US 2019/0028375 A1    Jan. 24, 2019

(30) Foreign Application Priority Data
Jul. 18, 2017   (IN) .............................. 201741025479

(51) Int. Cl.
| | |
|---|---|
| *H04L 12/26* | (2006.01) |
| *H04L 12/24* | (2006.01) |
| *H04L 29/08* | (2006.01) |
| *H04L 29/14* | (2006.01) |
| *H04L 29/06* | (2006.01) |
| *G06F 11/07* | (2006.01) |
| *G06F 11/00* | (2006.01) |
| *G06F 11/30* | (2006.01) |

(52) U.S. Cl.
CPC .............. *H04L 43/10* (2013.01); *G06F 11/00* (2013.01); *G06F 11/0754* (2013.01); *G06F 11/3006* (2013.01); *G06F 11/3055* (2013.01); *H04L 41/0893* (2013.01); *H04L 43/0817* (2013.01);

(Continued)

(58) Field of Classification Search
None
See application file for complete search history.

(56) References Cited

U.S. PATENT DOCUMENTS

| | | | |
|---|---|---|---|
| 6,289,379 B1 * | 9/2001 | Urano ..................... | H04L 43/00 709/223 |
| 8,539,080 B1 * | 9/2013 | Uluderya ................ | H04L 45/70 709/226 |

(Continued)

OTHER PUBLICATIONS

Javier et al. "Differentiated Quality of Service for e-Commerce Applications through Connection Scheduling based on System-Level Thread Priorities" (Year: 2007).*

(Continued)

*Primary Examiner* — Aaron N Strange
*Assistant Examiner* — Mohammad Yousuf A. Mian

(57) ABSTRACT

Techniques for prioritized client-server communications based on server health are disclosed. In one embodiment, a system includes multiple clients, and a server communicatively coupled to the multiple clients. The server may include a quality of service (QoS) aware server agent to divide the clients into client groups, assign a priority level to each of the client groups, monitor a health of the server, and determine heartbeat status messages to be sent to the client groups based on the assigned priority level and the health of the server. Each heartbeat message may indicate a state of the server. Further, the QoS aware server agent may send the heartbeat status messages to corresponding ones of the client groups and instruct clients corresponding to one or more of the client groups to send data based on the corresponding heartbeat status messages.

24 Claims, 7 Drawing Sheets

(52) U.S. Cl.
CPC ............ *H04L 67/322* (2013.01); *H04L 67/42* (2013.01); *H04L 69/40* (2013.01); *H04L 41/046* (2013.01)

(56) References Cited

U.S. PATENT DOCUMENTS

| | | | |
|---|---|---|---|
| 10,142,241 B1 * | 11/2018 | VanLoon | H04L 43/0852 |
| 2004/0019681 A1 * | 1/2004 | Nakamura | H04N 21/25808 |
| | | | 709/226 |
| 2009/0172155 A1 * | 7/2009 | Artobello | H04L 69/40 |
| | | | 709/224 |
| 2010/0131573 A1 * | 5/2010 | Reese | G06F 3/0481 |
| | | | 707/812 |
| 2011/0161488 A1 * | 6/2011 | Anderson | H04L 47/19 |
| | | | 709/224 |
| 2011/0208854 A1 * | 8/2011 | Zhang | G06F 9/5027 |
| | | | 709/224 |
| 2012/0117131 A1 * | 5/2012 | Maruyama | G06F 16/13 |
| | | | 707/827 |
| 2014/0266684 A1 * | 9/2014 | Poder | G08B 25/003 |
| | | | 340/521 |
| 2015/0006710 A1 * | 1/2015 | Sauerwald | H04L 67/125 |
| | | | 709/224 |

OTHER PUBLICATIONS

Matt et al. "Adaptive Overload Control for Busy Internet Servers" (Year: 2003).*

* cited by examiner

PRIORITIZED CLIENT-SERVER COMMUNICATIONS BASED ON SERVER HEALTH

RELATED APPLICATION

Benefit is claimed under 35 U.S.C. 119(a)-(d) to Foreign Application Serial No. 201741025479 filed in India entitled "PRIORITZED CLIENT-SERVER COMMUNICATIONS BASED ON SERVER HEALTH", filed on Jul. 18, 2017 by VMware, Inc., which is herein incorporated in its entirety by reference for all purposes.

TECHNICAL FIELD

The present disclosure relates to client-server systems, and more particularly to methods, techniques, and systems for prioritizing client-server communications based on server health.

BACKGROUND

In application/operating system (OS) monitoring environments or client-server environments, a server, a group of servers or a cluster of servers may communicate with multiple clients. For example, clients may include virtual machines, Internet of Things (IoT) gateways, cross cloud infra, mobile devices, and the like. In a client-server system, a client may send a service request to a server. The server may process the service request and respond with the result. When a server is connected to a significant number of clients (e.g., thousands of clients), a lot of data may get exchanged between the server and the clients. Each client may include an agent to collect metrics from underlying OS and/or services on the client, consolidate the metrics to generate consolidated data, and reports the consolidated data to the server for storage and analysis.

Figure 1A:
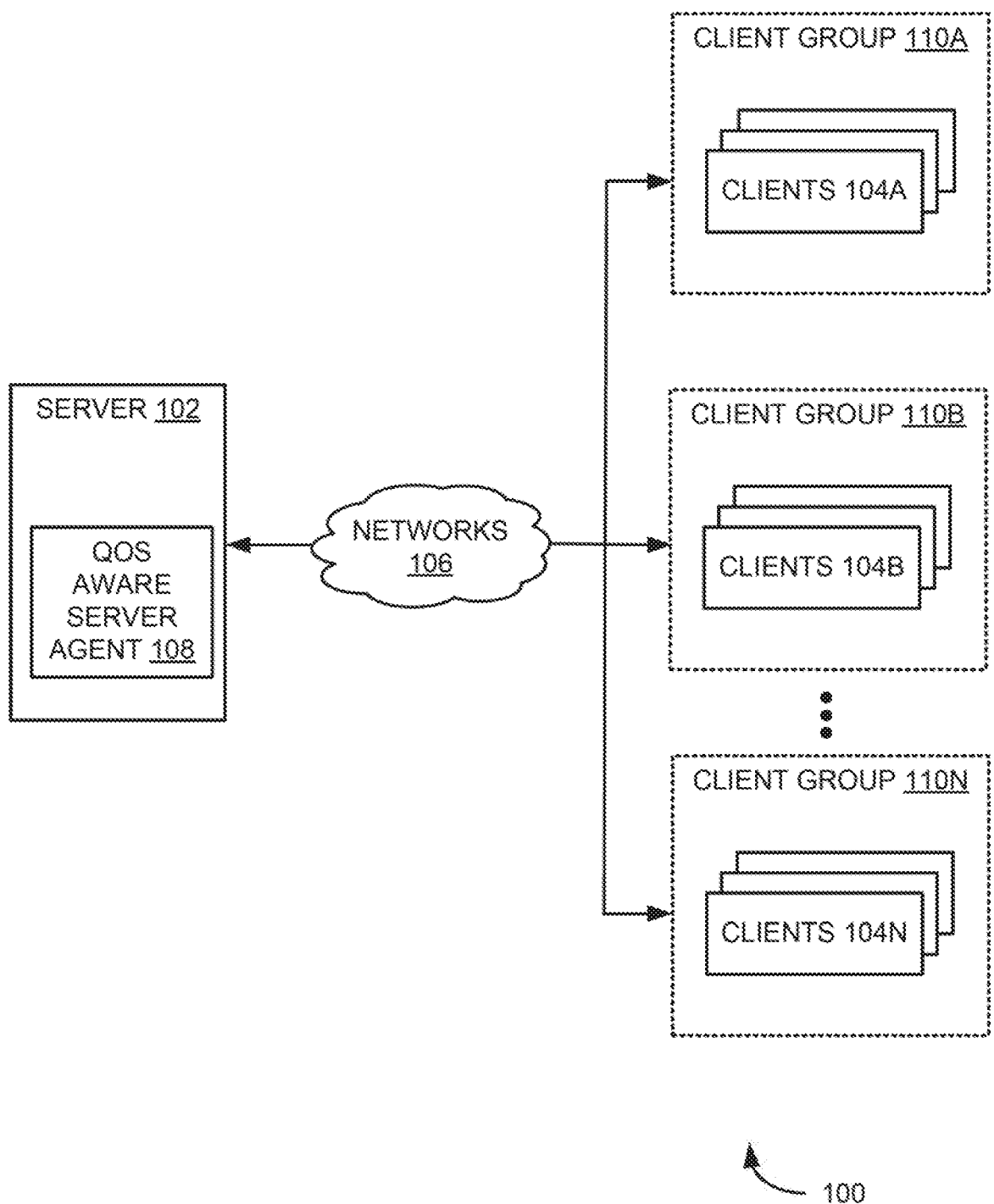
FIG. 1A is a system view of an example client-server environment illustrating a quality of service (QoS) aware server agent to prioritize client-server communications based on server health.

The drawings described herein are for illustration purposes only and are not intended to limit the scope of the present subject matter in any way.

DETAILED DESCRIPTION

Embodiments described herein may provide an enhanced computer-based and network-based method, technique, and system for prioritizing client-server communications based on server health. It is often desirable to measure QoS and other metrics in client-server systems to obtain an understanding of how the systems are operating and identify performance, availability, and responsiveness issues within the systems. In client-server environments, a server may communicate with multiple clients, with each client having an agent to collect metrics from underlying OS and/or services on the client, consolidate the metrics to generate consolidated data, and report the consolidated data to the server for storage and analysis. In such environments, the server may be bombarded with a lot of requests from the clients, for example, either after network disruptions or server restart due to maintenance/sick serve recovery. This may push the server to a sick state and hence may die due to limited resource (e.g., memory, central processing unit (CPU), database (OB) connection pool, and the like) constraints.

Even when the server is restarted, all the agents may try to send the requests at a same time, thereby pushing the server again to the sick state. When the server is recovering, the server can instruct agents not to send any requests, however, this may lead to an unmonitored environment. The unmonitored environment may not be acceptable to customers. In these scenarios, critical agents e.g., agents hosting critical applications in the clients) and the server whose health is being monitored, may suffer due to server's incapability to discriminate the critical agents from the non-critical agents. When the agents connect back to the server, as all the agents are treated equally, the critical agents hosting critical services are treated as equal to any other agent monitoring a test environment. Treating the agents equally may lead to critical misses on the service level agreements (SLAs) set on the critical agents. Treating the agents equally may become a concern on cloud-use-case where the SLAs of the critical services drive the cost and any glitch to the SLAs may affect the payout and the reputation of the "hosting service". Treating the agents equally, for example, during the network disruptions and server restart may also make the server unusable, impact customer experience, and/or lead the customer to look for different solutions.

When a sick server (e.g., with limited resources) is provided with the automatic ability to receive critical metrics from critical agents and at the same time is not bombarded by other non-critical agents, then the server could be healed. Further, when the server includes an automated way to detect the back-pressure, stagger the onslaught of agent messages, and continue to be healthy during the surge, this could ease the operations of the server and continue to function and handle any insurgency.

Examples described herein may provide a server having a QoS aware server agent to prioritize client-server communications based on server health, The QoS aware server agent may define client groups with each client group having a priority level and allocate a plurality of clients to the client groups according to a priority of each client. Further, the QoS aware server agent may monitor a health of the server and determine heartbeat status messages to be sent to the client groups based on the assigned priority level and the health of the server. Each heartbeat message indicates a state of the server. Furthermore, the QoS aware server agent may send the heartbeat status messages to corresponding ones of the client groups and instruct clients corresponding to one or more of the client groups to send data based on the corresponding heartbeat status messages. The state of the server may appear to be different for at least one client group based on the assigned priority level.

Examples described herein may provide the server with an automatic ability to throttle an onslaught of incoming requests and handle any surge or network inconsistency, along with built in self-healing and resilient remediation. Thus, examples described herein may provide an elegant solution with no extra cost of resources (e.g., additional resources, servers, or external load balancers) to implement the functionalities described herein and associated maintenance.

SYSTEM OVERVIEW AND EXAMPLES OF OPERATION

FIG. 1A is a system view of an example client-server environment 100 illustrating a QoS aware server agent 108 to prioritize client-server communications based on a health of a server 102. As shown in FIG. 1A, client-server environment 100 may include server 102 and clients 104 (e.g., clients 104A to clients 104N) that are in communication over one or more networks 106. Each client 104 may refer to a computing device or computer program (i.e., executing on a computing device) that requests services from server 102. Example clients 104 may include, but not limited to, virtual machines, IOT gateways, cross cloud infra, and mobile devices. The virtual machines, in some embodiments, may operate with their own guest operating systems on a computing device using resources of the computing device virtualized by virtualization software (e.g., a hypervisor, virtual machine monitor, and the like). Server 102 may refer to a computing device, or computer program (i.e., executing on a computing device), that provides some service to client programs or clients. Clients 104 and server 102 may communicate over communication links (e.g., networks 106). Communication is according to a protocol, which may be a message based protocol.

Figure 1B:
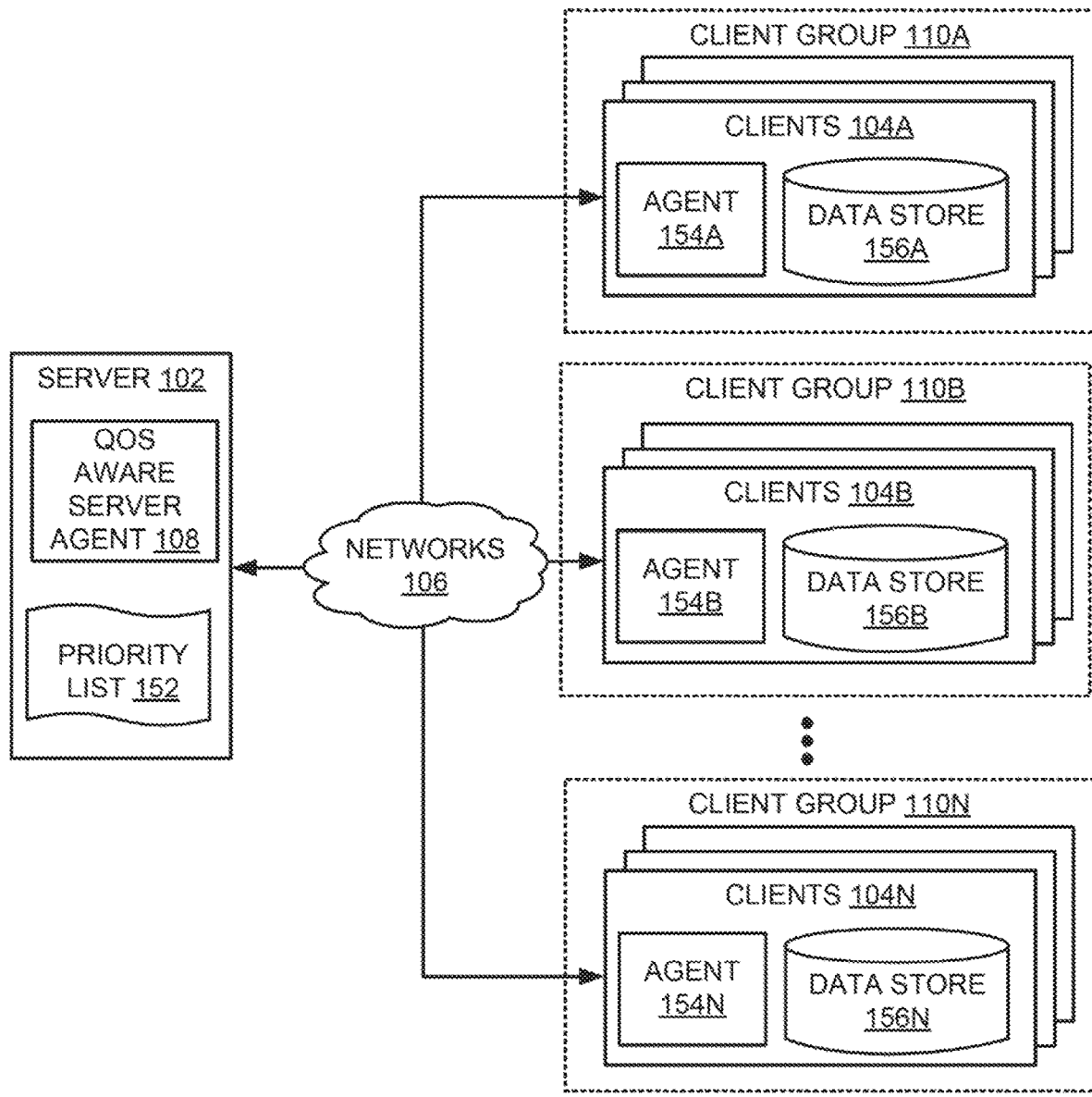
FIG. 1B is a system view of the example client-server environment illustrating additional features/components.

FIG. 1B is a system view of example client-server environment 100 illustrating additional features/components. As shown in FIG. 1B, each client 104 may include an agent 154 and a data store 156. For example, clients 104A includes corresponding one of agents 154A and data stores 156A, clients 104B includes corresponding one of agents 154B and data stores 156B, and so on. Examples described in FIGS. 1A and 1B depict server 102 in communication with multiple clients 104A-N, however, in some examples, a group of servers or a duster of servers can communicate with multiple clients 104A-N over one or more networks to provide services to clients 104A-N.

Agent 154 residing in each client 104 may collect metrics (e.g., QoS metrics) regarding a service on client 104 and to manipulate the metrics to generate aggregated data. Agent 154 may report the aggregated data to server 102 for storage and analysis. As used herein, the term "aggregated data" refers to data regarding client events (i.e., "event parameters") that has been collected and manipulated in accordance with aggregation rules. Aggregated data includes QoS metrics, as well as other types of information about client events. As used herein, "aggregation rules" may include rules specifying which event parameters are collected and how the event parameters are manipulated to generate aggregated data. For example, the aggregation rules may be provided by server 102.

Agent 154 may report the aggregated data to server 102 through a push or pull mechanism. In the pull mechanism, server 102 may request and pull the information from agents 154. In push mechanism, agents 154 may push the information to server 102. In one example, each agent 154 may have the ability to read/understand a health of server 102, tune itself based on the health of server 102, and persist the data locally when needed.

Furthermore, server 102 may include QoS aware server agent 108. QoS aware server agent 108 can be a part of management software residing in server 102. During operation, QoS aware server agent 108 may divide clients 104 into client groups 110A-N and assign a priority level to each of client groups 110A-N. In an example shown in FIG. 1A, client group 110A includes clients 104A, client group 110B includes clients 104B, and so on. Each client group 110 may include multiple clients that are grouped according to a priority of each client 104. In one example, a different priority level may be assigned to each of client groups 110A-N. Alternatively, QoS aware server agent 108 can define priority metrics in each of clients 104. For example, server 102 may be provided with capability to define some metrics as critical and send this configuration to clients 104. Server 102 may store a priority list 152 including the details of client groups 110A-N and associated priority levels.

For example, an admin of an online portal may prefer servers hosting an online book service to always be up than a survey portal. Another admin might be interested in specifying all the databases that need to be patched as higher priority than the databases that have already been patched. In another example, for the online portal hosting the book service, the availability of an application server and the user response time can be defined to be of higher priority amongst Key Performance Indicators (KPIs). In this case, when the server health is 'critical', only the critical KPIs may be sent to server 102 from client groups 110A-N having higher priority levels, so that the critical services can be monitored by server 102 in critical state.

Further, QoS aware server agent 108 may monitor a health of server 102. In one example, QoS aware server agent 108 may monitor the health of server 102 based on at least one parameter selected from a group consisting of a central processing unit (CPU) usage, a number of disk writes, a number of connected clients, and a memory usage. Further, the health of server 102 may be monitored at predetermined time intervals.

For example, sick symptoms of server 102 may be predefined by a user. Sick symptoms of server 102 may be defined based on a combination of parameters such as CPU percentage, disk writes percentage, number of client connections, memory usage of monitoring process that spans across different areas of the server. In another example, a server that connects to IoT gateways, may aggregate huge amount of data from different devices and may need the ability to write the huge amount of data in one-go. In this case, disk writes on a database server connected to the server becomes critical. Based on the sick symptoms defined and determined, server 102 can be provided with the ability to call itself 'good', 'critical', or 'sick'. In another example, the health of sever 102 can be measured as a percentage of health (e.g., the health of server 102 is degraded by 40%, 50%, 60%, and the like) based on the combination of parameters.

Further, QoS aware server agent 108 may determine heartbeat status messages to be sent to client groups 110A-N based on the assigned priority level and the health of server 102. Each heartbeat message indicates a state of server 102. In one example, the state of server 102 appears to be different for at least one of client groups 110A-N based on the assigned priority level. In another example, the state of server 102 appears to be different for different client groups 110A-N based on the assigned priority level. In one example, QoS aware server agent 108 may determine the heartbeat status messages to be sent to client groups 110A-N during one of network disruptions, restarting server 102 due to maintenance, and restarting server 102 due to sick server recovery.

Furthermore, QoS aware server agent 108 may send the heartbeat status messages to corresponding ones of client groups 110A-N. QoS aware server agent 108 may instruct clients 104 corresponding to one or more of client groups 110A-N to send data based on the corresponding heartbeat status messages. In one example, QoS aware server agent 108 may instruct clients 104 corresponding to one or more of client groups 110A-N having higher priority levels to send associated metrics based on the corresponding heartbeat status messages. In another example, QoS aware server agent 108 may instruct clients 104 corresponding to one or more of client groups 110A-N having higher priority levels to send only critical metrics based on the corresponding heartbeat status messages. For example, critical metrics may be defined in server 102 and details about the critical metrics may be communicated to corresponding ones of clients 104.

Consider an example that the health of server 102 can vary between 'good', 'critical', and 'sick'. In this example, the health of server 102 is explained using three states, however, any number of states can be used to define the health of server 102. Further, server 102 sends its health status to agents 154 as part of the heartbeat status messages. Based on server 102's heartbeat status messages, agents 154 can perform the following functions:

a. All agents 154 may send data to server 102 when the server 102 is 'good'.

b. When the server 102 is 'critical', agents 154 belonging to client groups (e.g., 110A-N) having higher priority levels can send the metrics or critical metrics to server 102. Agents 154 may persist other data (i.e., data associated with remaining priority levels and non-critical data) locally in respective data stores 156.

c. When the server 102 is 'sick', agents 154 may not send any data to server 102, but persist locally in respective data stores 156.

Now consider that client group 110A is having a first priority (e.g., gold), client group 110E is having a second priority (e.g., silver), and client group 110N is having a third priority (e.g., bronze). In this example, the order of priority, is: first priority>the second priority>the third priority.

During operation, QoS aware server agent 108 may determine a heartbeat status message indicating the state of server 102 as being 'good', 'critical', or 'sick' for each client group 110A-N based on the assigned priority level of each client group 110A-N. When the health of server 102 is 'good', QoS aware server agent 108 may determine and send a heartbeat status message indicating the state of server 102 as being 'good' to client groups 110A-N. In this case, all agents 154 may send data to server 102. When the health of server is 'sick', QoS aware server agent 108 may determine and send a heartbeat status message indicating the state of server 102 as being 'sick' to client groups 110A-N. In this case, all agents 154 may not send any data to server 102.

In one example, when the health of server is 'critical', QoS aware server agent 108 may determine a heartbeat status message indicating the state of server 102 as being 'good' to client group 110A, 'critical' to client group 110B, and 'sick' to client group 110N. In this case, when the heartbeat status message indicates the state of server 102 as being 'good' to client group 110A, clients 104A belonging to client group 110A sends all metrics to server 102. Further, when the heartbeat status message indicates the state of server 102 as being 'critical' to client group 110B, clients 104B belonging to client group 110B sends critical metrics and persists non-critical metrics in an associated local data store 156B. Furthermore, when the heartbeat status message indicates the state of server 102 as being 'sick' to client group 110N, clients 104N belonging to client group 110N persists all metrics in an associated local data store 156N.

In another example, the heartbeat status message indicates the state of server 102 as being 'good' to client groups 110A and 110B, and 'sick' to client group 110N. In yet another example, the heartbeat status message indicates the state of server 102 as being 'critical' to client groups 110A and 110B, and 'sick' to client group 110N. Any other combination can be possible such that the state of server 102 appears to be different for at least one client group 110 based on the assigned priority level.

Based on the assigned priority levels, server 102, when critical, may choose to appear 'sick' to lower priority groups and 'good' and/or 'critical' to higher priority groups, thereby reducing the incoming load/requests associated with non-critical agents and allowing server 102 to heal, at the same time, make itself available for mission-critical-agents. Also, during a restart of server 102, server 102 may appear as 'good' only to agents of higher priority groups, and 'sick' to lower priority agents, so that incoming requests can be controlled. Once the data received from the critical agents is handled and server 102 comes back to normal state, then server 102 appears as 'good' to other-not-so-critical agents. Thus, examples described herein may provide high resilience, automated back pressure detection and remediation, and self-healing of the sick server without any extra cost.

Examples described herein may be implemented in client-server systems where significant amount of data gets exchanged between clients 104 and server 102. An example of QoS aware server agent 108 can be implemented in vRealize™ Operations Manager, Log Insight™, vRealize Automation®, vRealize Business, and/or Hyperic® that are offered by VMware. QoS aware server agent 108 can be implemented in software as a service (SAAS), where server 102 communicating with multiple agents/probes/slaves could lead to onslaught of messages and may weaken server 102. QoS aware server agent 108 can be implemented in scenarios where the probes/agents on IoT Gateways which hold significant data from various devices, which in turn, sends this data to an upstream server.

In one example, QoS aware server agent 108 residing in server 102 and agents 154 residing in clients 104 may be implemented as engines or modules comprising any combination of hardware and programming to implement the functionalities described herein. QoS aware server agent 108 can be a service process in the management application or can be an appliance running in the data center to cater multiple management applications in a cloud based environment. For example, management application may be vSphere virtual center that is offered by VMware. Management application can be provided in a physical server, VM, or container.

In some examples, the functionalities described herein, in relation to instructions to implement functions of QoS aware server agent 108 and agents 154 and any additional instructions described herein in relation to the storage medium, may be implemented as engines or modules comprising any combination of hardware and programming to implement the functionalities of the modules or engines described herein. The functions of QoS aware server agent 108 and agents 154 may also be implemented by respective processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

EXAMPLE PROCESSES

Figure 2:
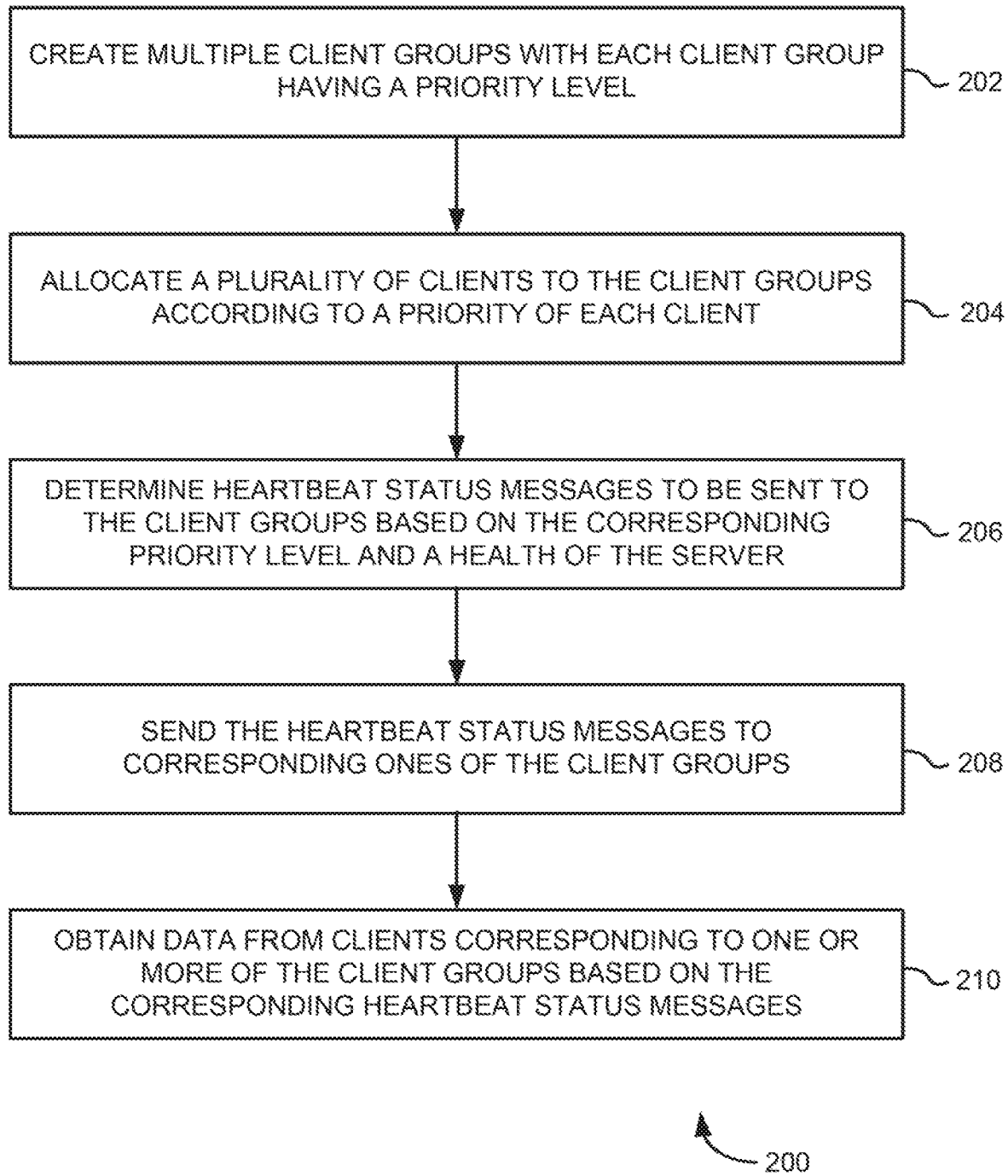
FIG. 2 is a flow diagram of an example method for prioritizing client-server communications based on server health.

FIG. 2 is a flow diagram 200 of an example method for prioritizing client-server communications based on server health. It should be understood that the process depicted in FIG. 2 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 202, multiple client groups may be created by a server, with each client group having a priority level. The priority level may be different for each of the client groups. At 204, a plurality of clients may be allocated to the client groups by the server according to a priority of each client. At 206, heartbeat status messages to be sent to the client groups may be. determined by the server based on the corresponding priority level and health of the server. For example, heartbeat message indicates a state of the server. In one example, the state of the server may appear to be different for at least one client group based on the corresponding priority level. In another example, the state of the server appears to be different for different client groups based on the priority level. The health of the server may be determined at predetermined time intervals.

In one example, the heartbeat status messages to be sent to the. client groups may be determined following network disruptions, following restart of the server due to maintenance, or following restart of the server due to sick server recovery as the number of requests to the server significantly increases during these scenarios. Alternately, the heartbeat status messages to be sent to the client groups may be determined at regular intervals. Further, the health of the server may be determined based on at least one parameter selected from a group consisting of a central processing unit (CUP) usage, a number of disk writes, a number of connected clients, and a memory usage.

At 208, the heartbeat status messages may be sent to corresponding ones of the client groups by the server. At 210, data from clients corresponding to one or more of the client groups may be obtained by the server based on the corresponding heartbeat status messages. In one example, metrics from the clients corresponding to the one or more of the client groups having higher priority levels may be obtained based on the corresponding heartbeat status messages. In another example, critical metrics from the clients corresponding to the one or more of the client groups having higher priority levels may be obtained based on the corresponding heartbeat status messages. For example, the critical metrics may be defined in the server and details about the critical metrics may be communicated to corresponding ones of the clients.

For example, a heartbeat status message indicating the state of the server as being good, critical, or sick may be determined for each client group based on the corresponding priority level of each client group and the health of the server. In one example, the state of the server may be indicated as being different for one or more of the client groups when the health of the server is critical. Further, the corresponding determined heartbeat status message may be sent to each client group. In one example, one of the following actions may be performed at each client group based on the heartbeat status message received at each client group:

1. when the heartbeat status message indicates the state of the server as being good to a client group, clients belonging to the client group may be enabled to send all metrics to the server,
2. when the heartbeat status message indicates the state of the server as being critical to the client group, clients belonging to the client group may be enabled to send critical metrics to the server and persist non-critical metrics in associated local data stores, and
3. when the heartbeat status message indicates the state of the server as being sick to the client group, enabling clients belonging to the client group to persist all metrics in the associated local data stores. Thus, the number of incoming requests to the server can be controlled.

Figure 3:
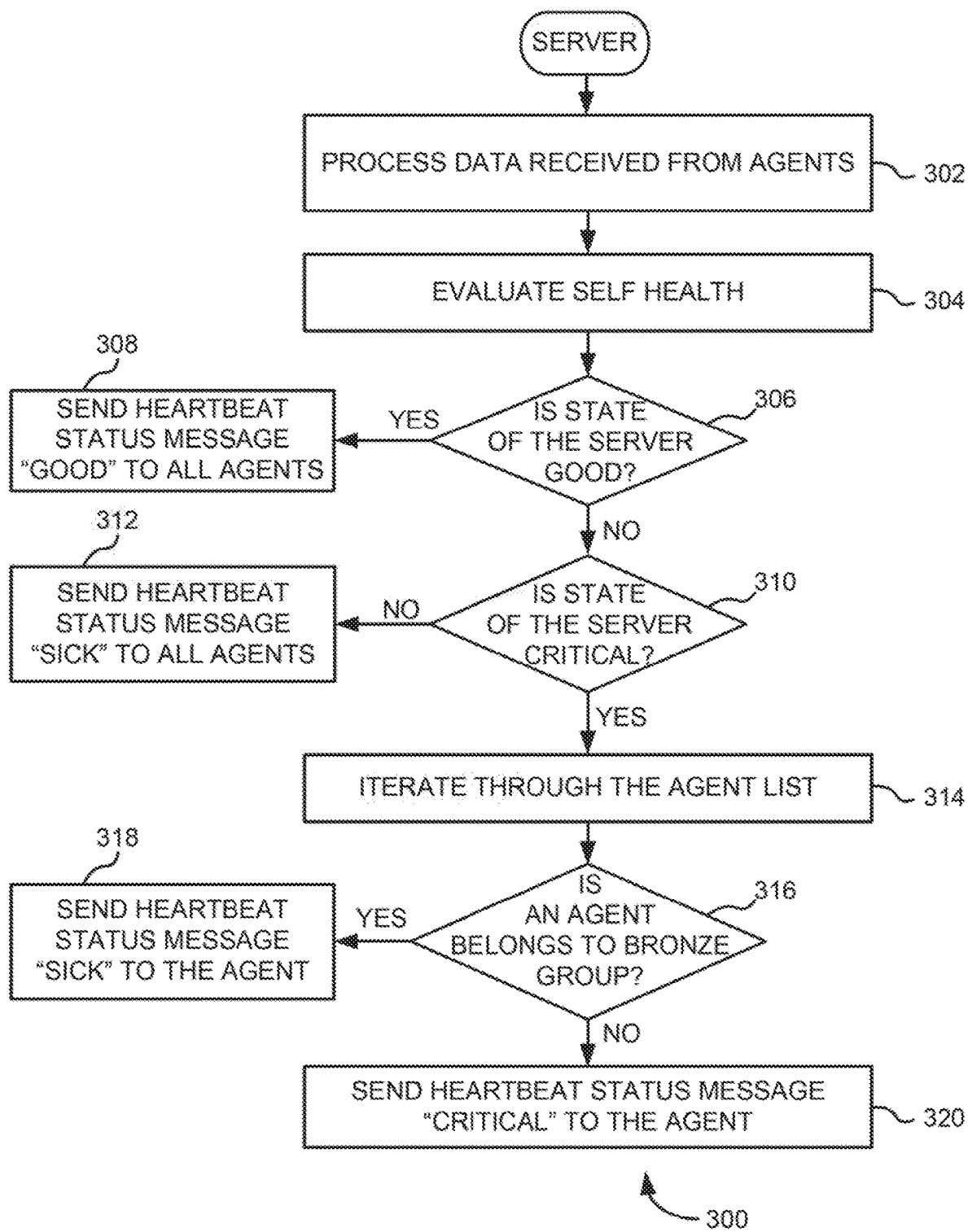
FIG. 3 is another example flow diagram illustrating a server side implementation of client-server communications when a health of the server is critical.

FIG. 3 is another example flow diagram 300 illustrating a server side implementation of client-server communications when a health of a server is critical. At 302, the server may process data received from agents residing in clients. The clients may be in communication with the server over one or more networks. At 304, the server may evaluate its self-health. At 306, a check is made to determine whether the state of the server is good. When the state of the server is good, at 308, the server may send heartbeat status message indicating the state of the server as being 'good' to all agents (e.g., in clients).

When the state of the server is not good, at 310, a check is made to determine whether the state of the server is critical. When the state of the server is not critical, at 312, the server may send heartbeat status message indicating the state of the server as being 'sick' to all agents.

In one example, the health of the server may be degraded due to underlying infrastructure issues or due to resource constraints. Consider that the server declares itself as 'critical' based on configured health symptoms. When the state of the server is critical, at 314, the server may iterate through the agent list (e.g., priority list 152 as shown in FIG. 1B). Further, at 316, a check is made to determine whether a first agent belongs to bronze group. When the first agent belongs to, the bronze group, at 318, the server may send heartbeat status message indicating the state of the server as being 'sick' to the first agent. When the first agent belongs to gold or silver group, at 320, the server may send heartbeat status message indicating the state of the server as being 'critical' to the first agent. The server repeats the steps 316, 318, and 320 for all agents in the agent list.

In the example shown in FIG. 3, due to ability of the server to group resources and metrics into preferred groups the server will appear 'critical' only to silver and gold groups of agents and instructs those agents to send only those metrics having high priority and the server appears 'sick' to bronze group.

Figure 4:
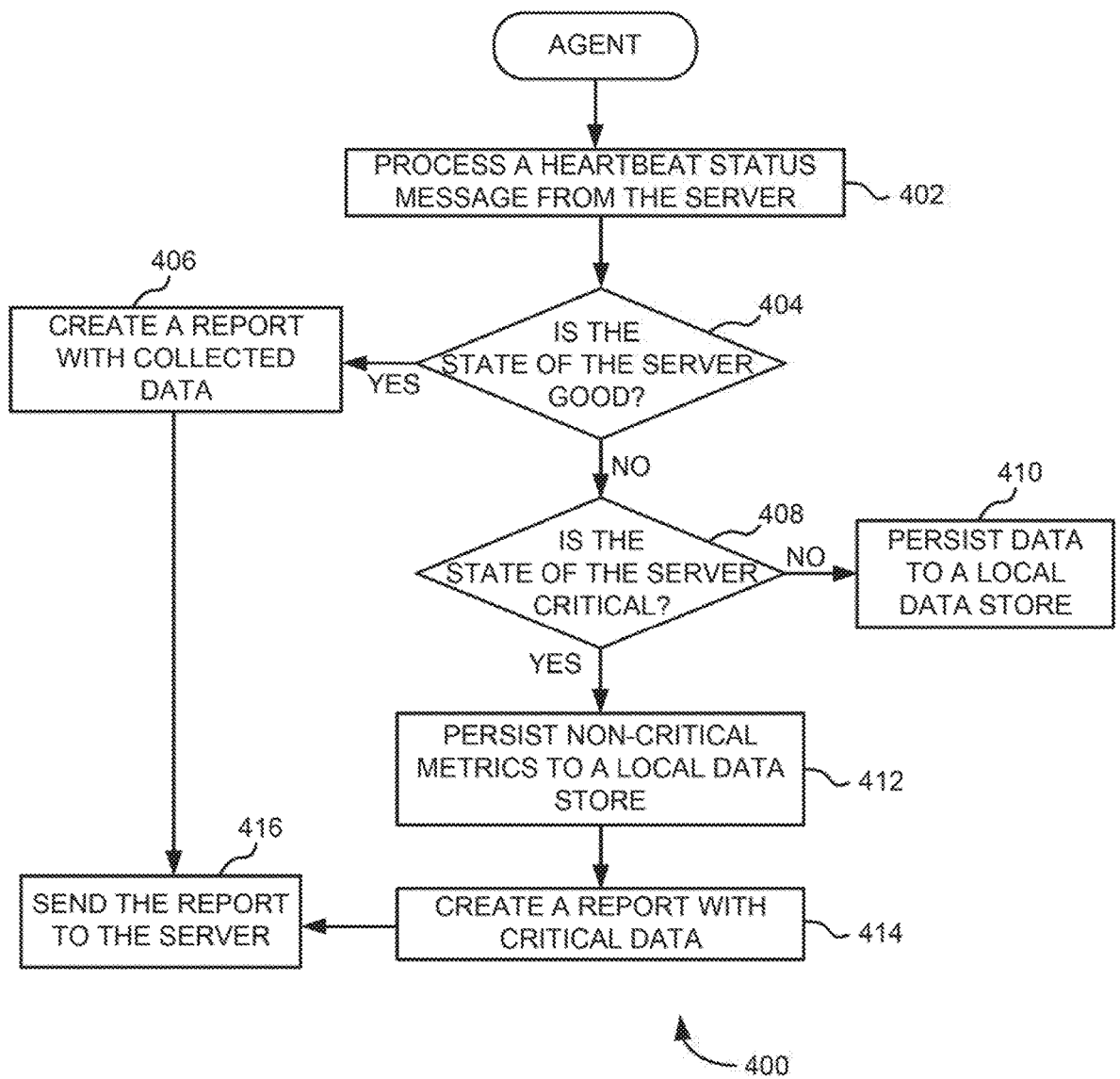
FIG. 4 is another example flow diagram illustrating a client side implementation of the client-server communications when the health of the server is critical.

FIG. 4 is another example flow diagram 400 illustrating a client side implementation of the client-server communications when the health of the server is critical. At 402, an agent residing in the client may process a heartbeat status message received from the server. At 404, a check is made to determine whether the heartbeat status message indicates the state of the server is good. When the heartbeat status message indicates the state of the server is good, at 406, the agent residing in the client may create a report with collected data and the report may be sent to the server (e.g., at 416).

When the heartbeat status message indicates the state of the server is not good, at 408, a check is made to determine whether the heartbeat status message indicates the state of the server is critical. When the heartbeat status message indicates the state of the server is sick (i.e., not good and not critical), at 410, the agent may persist data to a local data store associated with the client. When the heartbeat status message indicates the state of the server is critical, at 412, the agent may persist non-critical metrics to the local data store associated with the client. Furthermore, at 414, the agent residing in the client may create a report with critical data. At 416, the report with critical data may be sent to the server.

In the example shown in FIG. 4, the agents belonging to the bronze group may see the server as 'sick' based on the heartbeat message received from the server, persist the data locally, and wait for the server's status to change to 'good'. Meanwhile, the agents that belong to gold and silver, seeing the server as critical, may send only the metrics that are critical to the server (e.g., the critical metrics are decided in the group and are propagated to the agents when the agents are connected to the server, when the user modifies the priority group, or during any subsequent restarts). The agents may continue to persist the other-non-critical metrics and may send these non-critical metrics only when the health of the server changes to 'good'.

Figure 5:
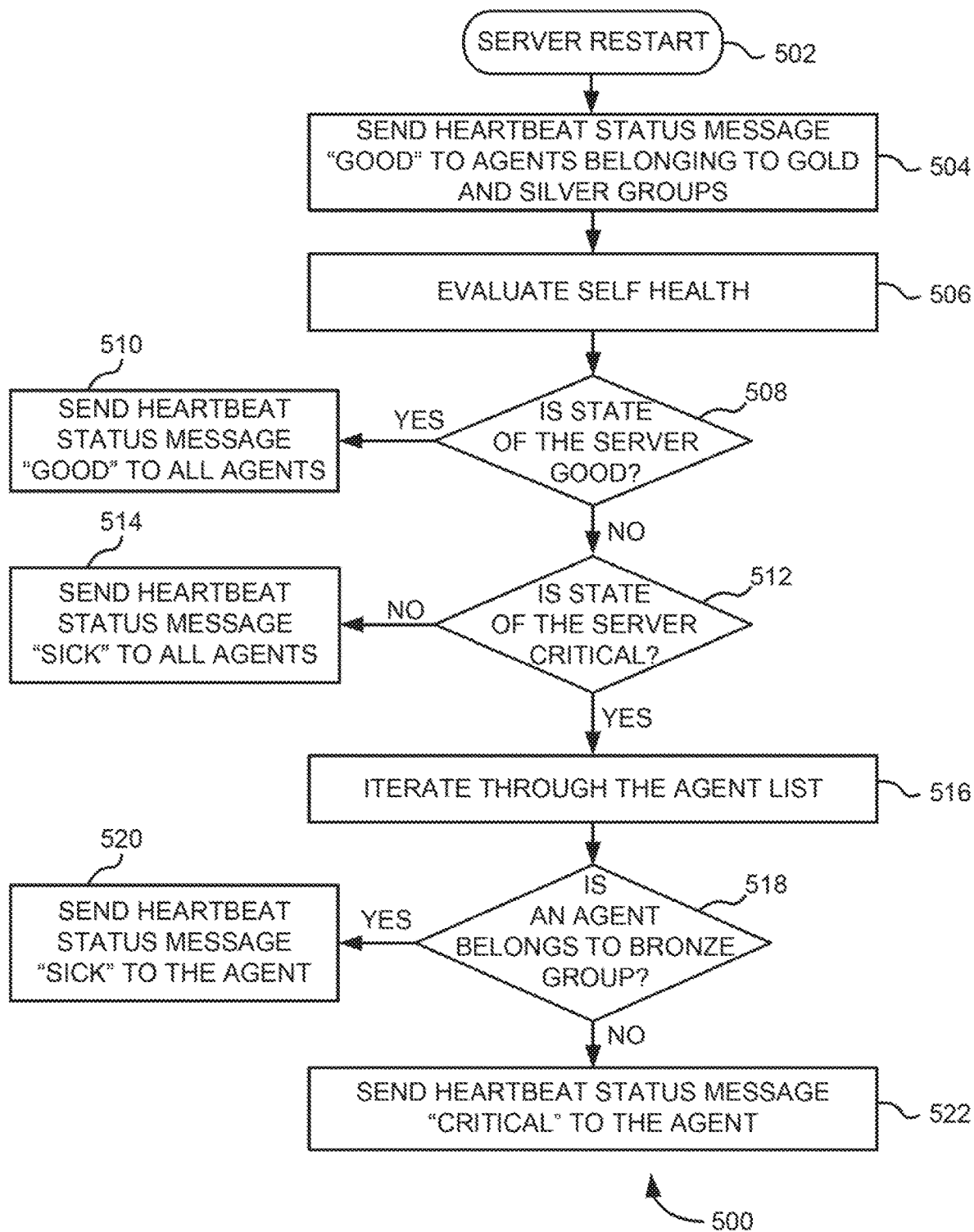
FIG. 5 is another example flow diagram illustrating a server side implementation of client-server communications during restart of a server.

FIG. 5 is another example flow diagram 500 illustrating a server side implementation of client-server communications during restart of the server. A server undergoes maintenance and then restarted back after the maintenance activity, at 502. During this period, the agents collecting metrics may lose the connectivity with the server hence they start caching the data in a corresponding local data store. When the server comes up, the server may send health status as part of the heartbeat to the agents. At 504, the server may send heartbeat message as 'good' to the agents belonging to 'gold' and 'silver' and appear as 'sick' to other groups (i.e., bronze), such that the processing of data from gold and silver can be completed and the server state can be stable for a considerable amount of time.

At 506, the server may evaluate its self-health. At 508, a check is made to determine whether the state of the server is good. When the state of the server is good, at 510, the server may send heartbeat status message indicating the state of the server as being 'good' to all agents. When the state of the server is not good, at 512, a check is made to determine whether the state of the server is critical. When the state of the server is not critical, at 514, the server may send heartbeat status message indicating the state of the server as being 'sick' to all agents.

When the state of the server is critical, at 516, the server may iterate through the agent list. Further, at 518, a check is made to determine whether a first agent belongs to bronze group. When the first agent belongs to the bronze group, at 520, the server may send heartbeat status message indicating the state of the server as being 'sick' to the first agent. When the first agent belongs to gold or silver'group, at 522, the server may send heartbeat status message indicating the state of the server as being 'critical' to the first agent. The server repeats the steps 518, 520, and 522 for all agents in the agent list. With this example flow diagram 500, the incoming data is throttled, without losing any data as the agents may continue to persist the data locally.

Figure 6:
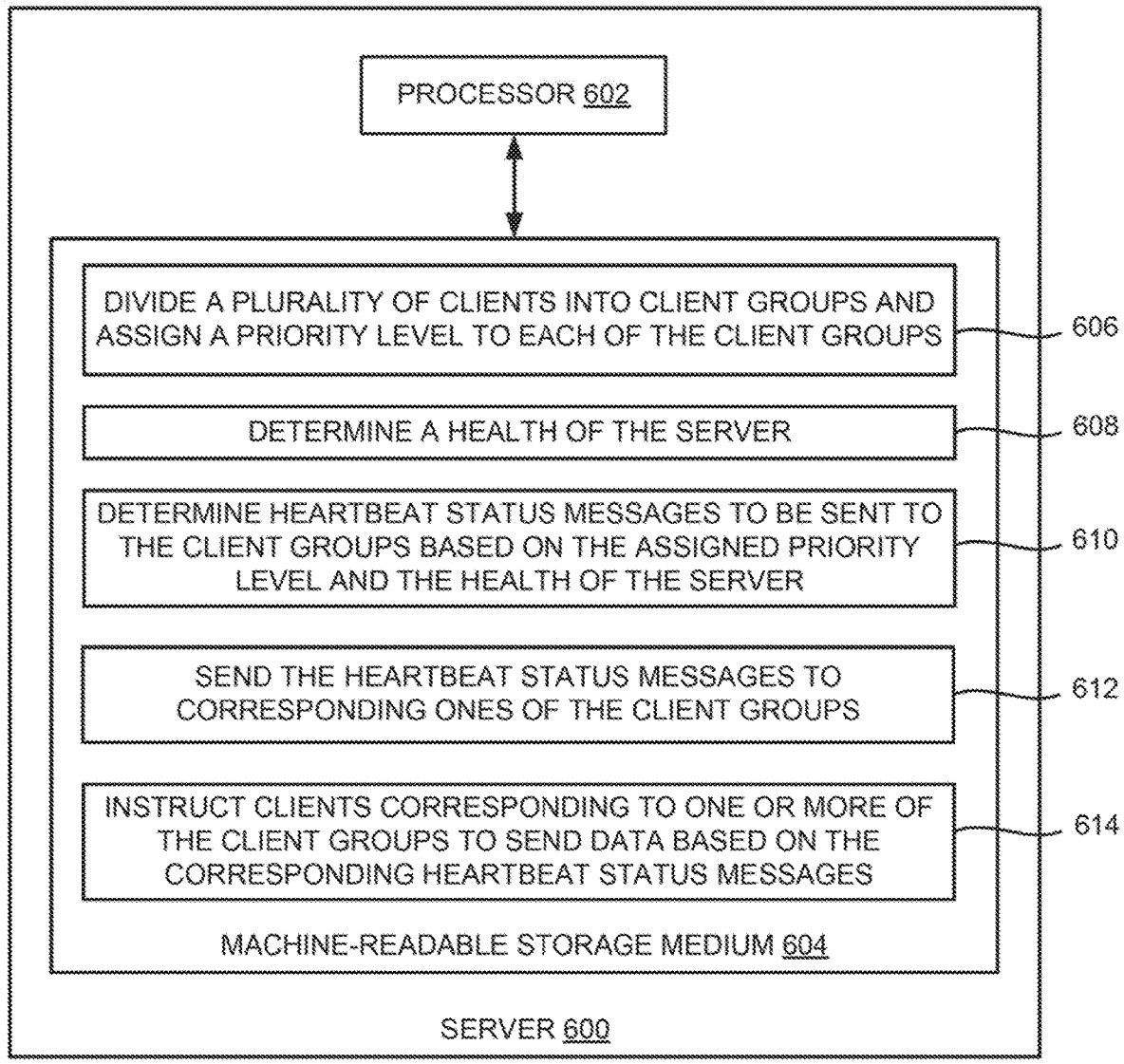
FIG. 6 is a block diagram of an example server including a non-transitory computer-readable storage medium storing instructions to prioritize client-server communications based on server health.

FIG. 6 is a block diagram of an example server 600 including a non-transitory computer-readable storage medium storing instructions to prioritize client-server communications based on server health. The server 600 (e.g., computing device) includes a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random-access memory (RAM) or another type of dynamic storage device that may store information and machine-readable instructions that may be executed by the processor 602. For example, the machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to the server 600.

The machine-readable storage medium 604 may store instructions 606-614. In an example, instructions 606-614 may be executed by processor 602 for prioritizing client-server communications based on the server health. Instructions 606 may be executed by processor 602 to divide a plurality of clients into client groups and assign a priority level to each of the client groups. Instructions 608 may be executed by processor 602 to determine a health of the server.

Instructions 610 may be executed by processor 602 to determine heartbeat status messages to be sent to the client groups based on the assigned priority level and the health of the server. Each heartbeat message may indicate a state of the server. Instructions 612 may be executed by processor 602 to send the heartbeat status messages to corresponding ones of the client groups. Instructions 614 may be executed by processor 602 to instruct clients corresponding to one or more of the client groups to send data based on the corresponding heartbeat status messages.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive. or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
    a plurality of clients; and
    a server communicatively coupled to the plurality of clients, wherein the server comprises a processor and memory, and wherein the memory includes a quality of service (QoS) aware server agent to:
        divide the plurality of clients into client groups and assign a priority level to each of the client groups;
        monitor a health of the server;
        determine a first heartbeat status message to be sent to a first client group based on an assigned priority level of the first client group and the health of the server;
        determine a second heartbeat status message to be sent to a second client group based on an assigned priority level of the second client group and the health of the server, wherein the second heartbeat status message indicates a state of the server that is different from the first heartbeat status message;
        send the first and second heartbeat status messages to the first and second client groups, respectively; and
        instruct clients corresponding to the first and second client groups to send data based on the corresponding first and second heartbeat status messages, wherein the QoS aware server agent is to instruct the clients corresponding to one of the first and second client groups having a higher priority level to send critical metrics based on the corresponding first and second heartbeat status messages, and wherein the critical metrics are defined in the server and details about the critical metrics are communicated to corresponding ones of the clients.

2. The system of claim 1, wherein assigning the priority level comprises assigning a different priority level to each of the client groups.

3. The system of claim 1, wherein the slate of the server appears to be different for different client groups based on the assigned priority level.

4. The system of claim 1, wherein the QoS aware server agent is to instruct the clients corresponding to one of the first and second client groups having the higher priority level to send associated metrics based on the corresponding first and second heartbeat status messages.

5. The system of claim 1, wherein the QoS aware server agent is to determine a heartbeat status message indicating the state of the server as being good, critical, or sick for each client group based on the assigned priority level of each client group.

6. The system of claim 5, wherein when the heartbeat status message indicates the state of the server as being good to a client group, clients belonging to the client group sends all metrics to the server.

7. The system of claim 5, wherein when the heartbeat status message, indicates the state of the server as being critical to a client group, clients belonging to the client group to send the critical metrics and persist non-critical metrics in an associated local data store.

8. The system of claim 5, wherein when the heartbeat status message indicates the state of the server as being sick to a client group, clients belonging, to the client group to persist all metrics in an associated local data store.

9. Thee system of claim 1, wherein the QoS aware server agent is to determine the first and second heartbeat status messages to be sent to the first and second client groups, respectively, during one of network disruptions, restarting the server due to maintenance, and restarting the server due to sick server recovery.

10. The system of claim 1, wherein the QoS aware server agent is to monitor the health of the server based on at least one parameter selected from a group consisting of a central processing unit (CPU) usage, a number of disk writes, a number of connected clients, and a memory usage, and wherein the health of the server is monitored at predetermined time intervals.

11. A method comprising:
    creating, by a server, multiple client groups with each client group having a priority level;
    allocating, by the server, a plurality of clients to the client groups according to a priority of each client;
    determining, by the server, a first heartbeat status message to hr sent to a first client group based on a priority level of the first client group and a health of the server:
    determining, by the server, a second heartbeat status message to be sent to a second client group based on a priority level of the second client group and the health of the server, wherein the second heartbeat status message indicates a state of the server that is different from the first heartbeat status message;
    sending the first and second heartbeat status messages to the first and second client groups, respectively, by the server; and obtaining, by the server, data from clients corresponding to the first and second client groups based on the corresponding first and second heartbeat status messages, wherein obtaining data from the clients correspondingthe first and second client groups comprises:
   obtaining critical metrics from the clients corresponding to one of the first and second client groups having a higher priority level based on the corresponding first and second heartbeat status messages, and wherein the critical metrics are defined in the server and details about the critical metrics are communicated to corresponding ones of the clients.

12. The rirethod of claim 11, wherein the priority level is different for each of the client groups.

13. The method of claim 11, wherein the state of the server appears to be different for different client groups based on the priority level.

14. The method of claim 11, wherein obtaining data from the clients corresponding to the first and second client groups comprises:
   obtaining metrics from the clients corresponding to one of the first and second client groups having the higher priority level based on the corresponding first and second heartbeat status messages.

15. The method of claim 11, wherein determining the first and second heartbeat status messages to he sent to the first and second client groups based on the corresponding priority level and the health of the server comprises:
   determining a heartbeat status message indicating the state of the server as being good, critical, or sick for each client group based on the corresponding priority level of each client group and the health of the server.

16. The method of claim 15, wherein obtaining data from clients corresponding to the first and second client groups based on the corresponding first and second heartbeat status messages comprises;
   for each client group,
      when the heartbeat status message indicates the state of the server as being good to a client group, enabling clients belonging to the client group to send all metrics to the server;
      when the heartbeat status message indicates the state of the server as being critical to the client group, enabling clients belonging to the client group to send the critical metrics to the server and persist non-critical metrics in associated local data stores; and
      when the heartbeat status message indicates the state of the server as being sick to the client group, enabling clients belonging to the client group to persist all metrics in the associated local data stores.

17. The method of claim 11, wherein the first and second heartbeat status messages to he sent to the first and second client groups, respectively, are determined following network disruptions, following restart of the server due to maintenance, following restart of the server due to sick server recovery, or at regular intervals.

18. The method of claim 11, comprising determining the health of the server based on at least one parameter selected from a group consisting of a central processing unit (CPU) usage, a number of disk writes, a number of connected clients, and a memory usage, wherein the health of the server is determined at predetermined time intervals.

19. A non-transitory machine-readable medium storing instructions executable by a server to:
   divide a plurality of clients into client groups and assign a priority level to each of the client groups;
   determine a health of the server;
   determine a first heartbeat status message to be sent to a first client group based on an assigned priority level of the first, client group and the health of the server;
   determine a second heartbeat status message to be sent to a second client group based on an assigned priority level of the second client group and the health of the server, wherein the second heartbeat status message indicates a state of the server that is different from the first heartbeat status message;
   send the first and second heartbeat status messages to the first and second client groups, respectively; and
   instruct clients corresponding to the first and second client groups to send data based on the corresponding first and second heartbeat status messages, wherein instructing the clients corresponding to the first and second client groups to send the data comprises:
      instruct the clients corresponding to one of the first and second diem groups having a higher priority level to send critical metrics based on the corresponding, first and second heartbeat status messages, and wherein the critical metrics are defined in the server and details about the critical metrics are communicated to corresponding ones of the clients.

20. The non-transitory machine-readable medium of claim 19, wherein the state of the server appears to be different for different client groups based on the assigned priority level.

21. The non-transitory machine-readable medium of claim 19, wherein instructing the clients corresponding to the client groups to send the data comprises:
   instructing the clients corresponding to one of the first and second client groups having the higher priority level to send associated metrics based on the corresponding, first and second heartbeat status messages.

22. The non-transitory Machine-readable medium of claim 19, wherein determining the first and second heartbeat status messages to be sent to the first and second client groups based on the assigned priority level and the health of the server comprises:
   determining a heartbeat status message indicating the state of the server as being good, critical, or sick for each client group based on the assigned priority level of each client group and the health of the server.

23. The non-transitory machine-readable medium of claim 22, wherein instructing the clients corresponding to the first and second client groups to send data based on the corresponding first and second heartbeat status messages comprises:
   for each client group,
      when the heartbeat status message indicates the state of the server as being good to a client group, instructing clients belonging to the client group to send all metrics to the server;
      when the heartbeat status message indicates the state of the server as being critical to the client group, instructing clients belonging to the client group to send the critical metrics to the server and persis non-critical metrics in an associated local data store; and
      when the heartbeat statin message indicates the state of the server as being sick to the client group, instructing clients belonging to the client group to persist all metrics in an associated local data store.

24. The non-transitory machine-readable medium of claim 19, wherein the first and second heartbeat status messages to be sent to the first and second client groups, respectively, are determined following network disruptions, following restart of the server due to maintenance, following restart of the server due to sick server recovery, or at regular intervals.

* * * * *